United States Patent
Park et al.

(10) Patent No.: US 9,355,491 B2
(45) Date of Patent: May 31, 2016

(54) RAY TRACING APPARATUS AND METHOD

(75) Inventors: Chan Min Park, Seoul (KR); Tack Don Han, Seoul (KR); Jin Woo Kim, Seoul (KR); Jeong Soo Park, Gwacheon-si (KR); Jae Ho Nah, Seoul (KR)

(73) Assignees: Samsung Electronics Co., Ltd., Suwon-si (KR); INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 567 days.

(21) Appl. No.: 13/067,733

(22) Filed: Jun. 22, 2011

(65) Prior Publication Data
US 2012/0050289 A1 Mar. 1, 2012

(30) Foreign Application Priority Data
Aug. 26, 2010 (KR) .................. 10-2010-0083108

(51) Int. Cl.
*G06T 15/06* (2011.01)
*G06T 17/00* (2006.01)

(52) U.S. Cl.
CPC .............. *G06T 15/06* (2013.01); *G06T 17/005* (2013.01)

(58) Field of Classification Search
CPC ....... G06T 15/005; G06T 15/06; G06T 15/00; G06T 15/08; G06T 17/005
See application file for complete search history.

(56) References Cited

U.S. PATENT DOCUMENTS

| | | | | |
|---|---|---|---|---|
| 5,247,627 A | * | 9/1993 | Murakami et al. | 712/236 |
| 5,355,478 A | * | 10/1994 | Brady | G06F 7/24 |
| 6,567,815 B1 | * | 5/2003 | Rubin | G06F 17/30961 |
| 2008/0024489 A1 | * | 1/2008 | Shearer | 345/421 |
| 2008/0122841 A1 | * | 5/2008 | Brown | G06T 15/40 345/421 |
| 2009/0172418 A1 | * | 7/2009 | Jakobsson | 713/193 |

FOREIGN PATENT DOCUMENTS

| | | |
|---|---|---|
| KR | 10-2008-0020198 | 3/2008 |
| KR | 10-2009-0020924 | 2/2009 |
| KR | 10-2010-0042052 | 4/2010 |

OTHER PUBLICATIONS

Yoon, Sung-Eui, and Dinesh Manocha. ("Cache-Efficient Layouts of Bounding Volume Hierarchies." Computer Graphics Forum. vol. 25. No. 3. Blackwell Publishing, Inc, 2006).*

* cited by examiner

*Primary Examiner* — Mark Zimmerman
*Assistant Examiner* — Nurun N Flora
(74) *Attorney, Agent, or Firm* — NSIP Law

(57) ABSTRACT

An image processing apparatus is provided. A splitting unit of the image processing apparatus may split a first space within an input three-dimensional (3D) model into a plurality of subspaces in order to generate an acceleration structure of the input 3D model. A decision unit of the image processing apparatus may set a subspace determined as having a relatively high probability of including a ray progress path among the plurality of subspaces, as a child node having a relatively high traversal priority in the acceleration structure among a plurality of child nodes.

17 Claims, 7 Drawing Sheets

RAY TRACING APPARATUS AND METHOD

CROSS-REFERENCE TO RELATED APPLICATIONS

This application claims the priority benefit of Korean Patent Application No. 10-2010-0083108, filed on Aug. 26, 2010, in the Korean Intellectual Property Office, the disclosure of which is incorporated herein by reference.

BACKGROUND

1. Field

One or more example embodiments relate to an image processing apparatus and method that may generate a ray traversal acceleration structure in image rendering of a ray tracing scheme.

2. Description of the Related Art

Three-dimensional (3D) rendering corresponds to image processing that may synthesize 3D object data and an image observed from a given camera viewpoint.

3D rendering methods may include a rasterization scheme of generating an image while projecting a 3D object onto a screen, a ray tracing scheme of tracing a path of light incident along a ray towards each pixel of an image from a camera view, and the like.

The ray tracing scheme may generate a high quality image in rendering results, since ray tracing uses physical properties of lighting such as reflection, refraction, transmission, depth of field, shadows, and the like. However, due to a relatively large amount of calculations, the ray tracing scheme has difficulty in performing real-time rendering.

Usually, in a ray tracing, the ray traversal of an acceleration structure where scene objects to be rendered are spatially split and a ray-primitive intersecting test may need a relatively large amount of calculations.

SUMMARY

The foregoing and/or other aspects are achieved by providing an image processing apparatus, including a processor to control one or more processor-executable units, a splitting unit to split a first space within an input three-dimensional (3D) model into a plurality of subspaces in order to generate an acceleration structure of the input 3D model, and a decision unit to set a subspace determined as having a relatively high probability of including a ray progress path among the plurality of subspaces, as a child node having a relatively high traversal priority in the acceleration structure among a plurality of child nodes.

The decision unit may determine a spatial structure having a relatively large surface area among the plurality of subspaces, as the subspace having the relatively high probability of including the ray progress path.

The acceleration structure may correspond to one data structure of a kd-tree, a bounding volume hierarch (BVH), a grid, and the like.

The child node having the relatively high traversal priority corresponds to a left child node that is priorly traversed in a depth first tree traversal prior to other child nodes.

The image processing apparatus may further include a flag setting unit to add, to the child node having the relatively high traversal priority, a flag bit used to identify whether a subspace relatively close to an origin in a world coordinate system among the plurality of subspaces is matched with the subspace determined to have the relatively high probability of including the ray progress path.

The splitting unit may designate a split axis for splitting the first space, set at least one split surface candidate by aligning a plurality of primitives within the first space along the split axis, select a split surface from the at least one split surface candidate according to a surface area heuristic based greedy algorithm, and split the first space into the plurality of subspaces using the selected split surface.

The splitting unit may recursively repeat the splitting process with respect to a space non-split within the input 3D model until a leaf node generation criterion is satisfied yielding a plurality of children of the child node.

The image processing apparatus may further include a memory to store the generated acceleration structure, and a ray tracer to render an image observed at a predetermined viewpoint according to a ray tracing scheme, using at least one of the stored acceleration structure.

The foregoing and/or other aspects are achieved by providing an image processing method, including splitting, by way of a processor, a first space within an input three-dimensional (3D) model into a plurality of subspaces in order to generate an acceleration structure of the input 3D model, and setting a subspace determined as having a relatively high probability of including a ray progress path among the plurality of subspaces, as a child node having a relatively high traversal priority in the acceleration structure among a plurality of child nodes.

The foregoing and/or other aspects are achieved by providing an image processing apparatus, including a processor to control one or more processor-executable units, a splitting unit to split a space within an input three-dimensional (3D) model into a plurality of subspaces in order to generate an acceleration structure of the input 3D model, and a decision unit to compare surface areas of the plurality of subspaces and to set a subspace, determined as having a relatively large surface area among the plurality of subspaces, as a child node having a relatively high traversal priority in the acceleration structure among the plurality of child nodes.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
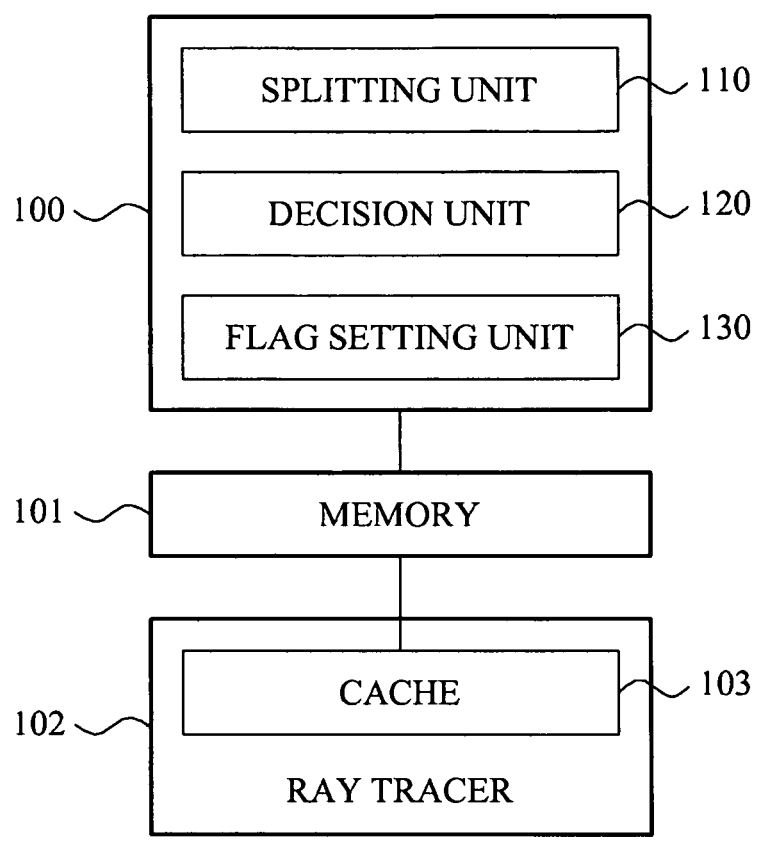
FIG. 1 illustrates an image processing apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an image processing apparatus 100 according to example embodiments.

Referring to FIG. 1, the image processing apparatus 100 may include, for example, a splitting unit 110, a decision unit 120, and a flag setting unit 130.

The splitting unit 110 may split a first space of an input three-dimensional (3D) model into a plurality of subspaces.

The splitting unit 110 may designate a split axis, align primitives along the split axis, and set split surface candidates. The splitting unit 110 may calculate an operation cost for each split surface candidate and may select a split surface minimizing the operation cost from the split surface candidates.

Calculation of the operation cost and selection of the split surface will be further described below with reference to Equation 1 and Equation 2, and FIG. 5.

The decision unit 120 may be involved in the generation of a child node in an acceleration structure according to the above space split.

When a space corresponding to a single node is split into two subspaces and two child nodes are generated, the decision unit 120 may set, to a left child node, a child node having a relatively large surface area (SA) between the two subspaces.

An operation of the decision unit 120 will be further described below with reference to FIG. 3 and FIG. 4.

The flag setting unit 130 may indicate, in each generated node, using a flag bit, for example, a one-bit digit, whether a depth first layout (DFL) scheme by a conventional method is inverted. The flag bit may be included in each node within the acceleration structure.

Generation of the flag bit will be further described below with reference to FIG. 5 and FIG. 7.

Hereinafter, example embodiments will be described by referring to an exemplary 3D model.

Figure 2:
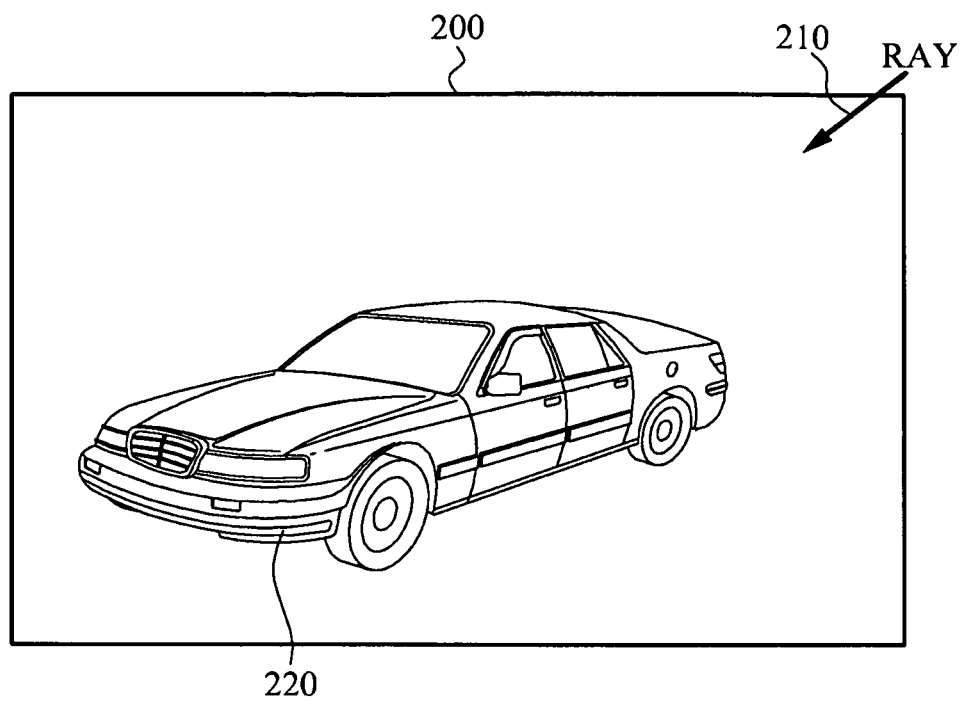
FIG. 2 illustrates a three-dimensional (3D) model corresponding to generation and traversal of an acceleration structure of the image processing apparatus of FIG. 1 according to example embodiments.

FIG. 2 illustrates an exemplary 3D model 200 corresponding to generation and traversal of an acceleration structure of the image processing apparatus 100 according to example embodiments.

A modeled object 220 of a sedan is included within the exemplary 3D model 200 as an example. For image rendering at a predetermined camera view (not shown) by ray tracing, a collision test with respect to a ray 210 may need to be performed.

According to a ray tracing scheme, a ray progress direction may be inversely traced based on a portion of the object 220 colliding with the ray 210 departing from the camera viewpoint, which corresponds to an intersecting test, a progress direction of reflected light when the collision occurs, a reflection or refraction level, and the like.

To accelerate the collision test of the ray 210, the image processing apparatus 100 may generate the acceleration structure using primitives including geometry information within the 3D model 200.

The acceleration structure may correspond to a data structure, for example, a kd-tree, a bounding volume hierarchy (BVH), and a grid. The acceleration structure enables a ray tracer 102 to be present in a ray progress direction and to quickly access primitives for which an inserting test needs to be performed. Here, the ray tracer 102 may be a processor performing ray tracing.

According to example embodiments, a tree, for example, the kd-tree may be used as the acceleration structure and the primitives constituting the object 220 within the 3D model 200 may be triangles.

In this example, a ray tracing process may be performed as follows.

With respect to a predetermined ray, the ray tracer 102 may perform hierarchical traversal of lower nodes starting from a root node of the generated acceleration structure, and may find a leaf node initially visited by the ray.

When the leaf node is found, the ray tracer 102 may perform an intersecting test with the ray with respect to triangles that are primitives within the leaf node.

When an intersecting triangle is not found within the leaf node, the ray tracer 102 may find a subsequent leaf node through continuing traversal of the kd-tree and find a primitive triangle intersecting the ray within the found subsequent leaf node.

The above process may be repeated until the primitive triangle actually intersecting the ray is found.

When an intersecting primitive is not found through the intersecting test within a single leaf node and thus, an access to another leaf node is attempted, the appropriate data of the acceleration structure stored in a memory 101 may need to be fetched to a cache 103 within the ray tracer 102 so that the quantity of accesses to the memory 101 may be reduced.

Since speed degradation caused by memory latency may be prevented and a relatively small memory bandwidth may thus be required, it is possible to speed up operations.

According to example embodiments, when the acceleration structure is generated by splitting a spatial structure of the 3D model 200, leaf nodes to be sequentially accessed along a progress path of the ray 210 may have a spatial locality within the memory 101. Accordingly, a cache hit probability within the cache 103 may increase and thus, the operation resource may be efficiently used.

Hereinafter, example embodiments in generation of the acceleration structure will be further described through a comparison with a conventional method.

Figure 3:
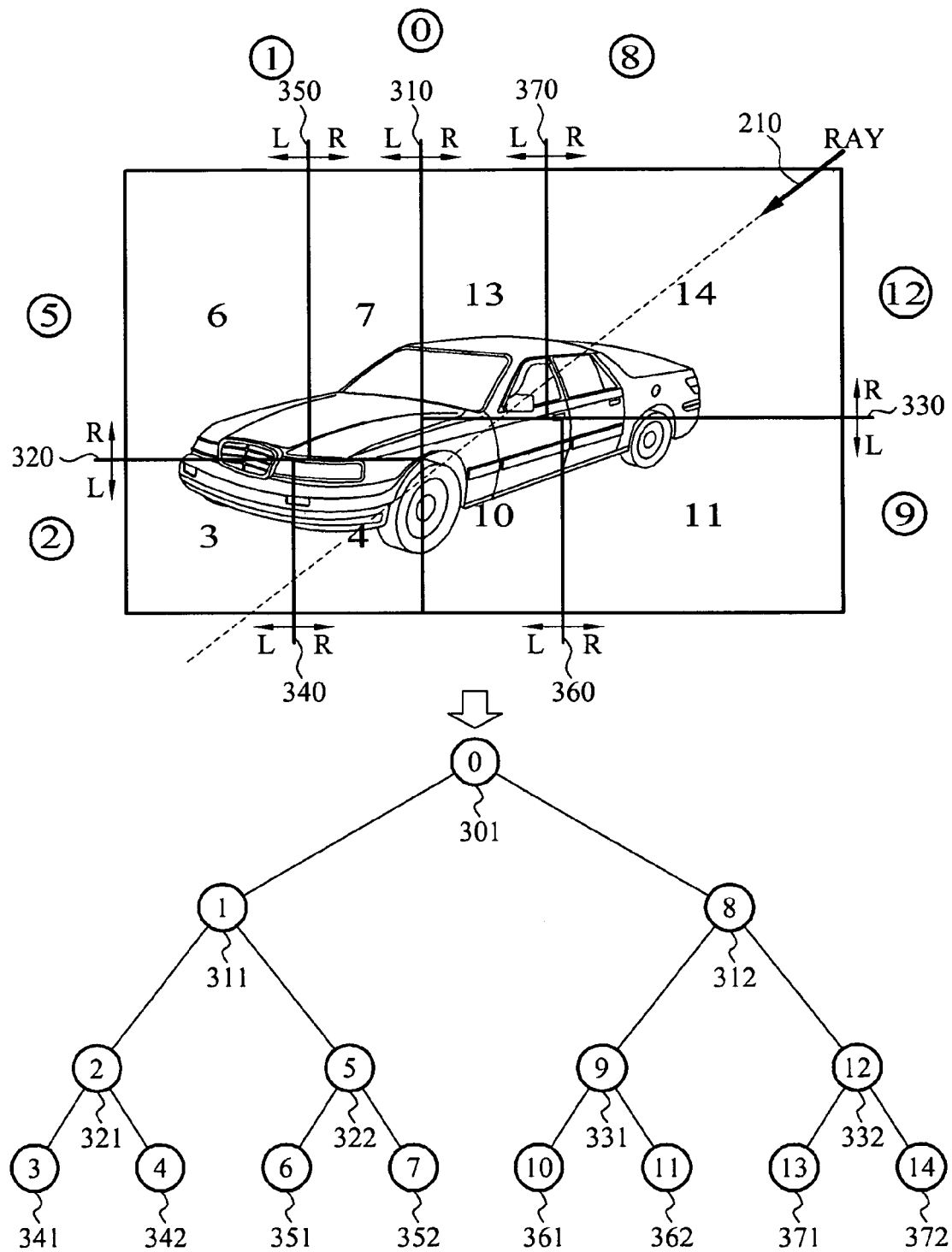
FIG. 3 illustrates a process of generating an acceleration structure by splitting the 3D model of FIG. 2 so that a depth first traversal may be performed according to a conventional method.

FIG. 3 illustrates a process of generating an acceleration structure by splitting the 3D model 200 of FIG. 2 so that a depth first traversal may be performed according to a conventional method.

According to the conventional method, space splitting and the acceleration structure as pre-processing of ray tracing may be performed as follows.

A predetermined split axis for selecting a split surface with respect to a space may be determined. A plurality of split surface candidates may be set by aligning primitives along the split axis.

An actual split surface may be selected from the plurality of split surface candidates by determining whether a split is to be used, and if necessary, which surface is to be split to minimize an operation cost based on an operation cost for each split surface candidate.

Child nodes corresponding to generated subspaces may be generated below a node corresponding to the split surface using the selected split surface.

In this example, according to the conventional method, a child node has been uniformly determined as a left child node or a right child node depending on whether the child node is close to or away from a coordinate origin in a world coordinate system based on the selected split surface.

In a depth first tree traversal, the left child node is traversed prior to the right child node and thus, priority may become an issue. According to the conventional method, the priority has been uniformly determined based on a location of a corresponding node on a coordinate axis.

For example, as shown in FIG. 3, when the entire space of the 3D model 200 is split based on a split surface 310, a left child node 311 corresponding to a subspace of a left portion close to the coordinate origin may be generated. A right child node 312 corresponding to a subspace of a right portion away from the coordinate origin may be generated.

FIG. 3 illustrates a result of recursively repeating the above space splitting process according to the conventional method.

In contrast, according to example embodiments, instead of uniformly determining a generated child node as a left child node or a right child node depending on a distance from a coordinate origin as in the conventional method, the generated child node may instead be determined as the left child node or the right child node based on a determination of the relative probability of the node including a ray progress path. For example, in an embodiment, the child node having the highest probability of including a ray progress path among a plurality of child nodes may be selected as the left child node, while the child node having the lowest probability of including a ray progress path among the plurality of child nodes may be selected as the right child node.

Figure 4:
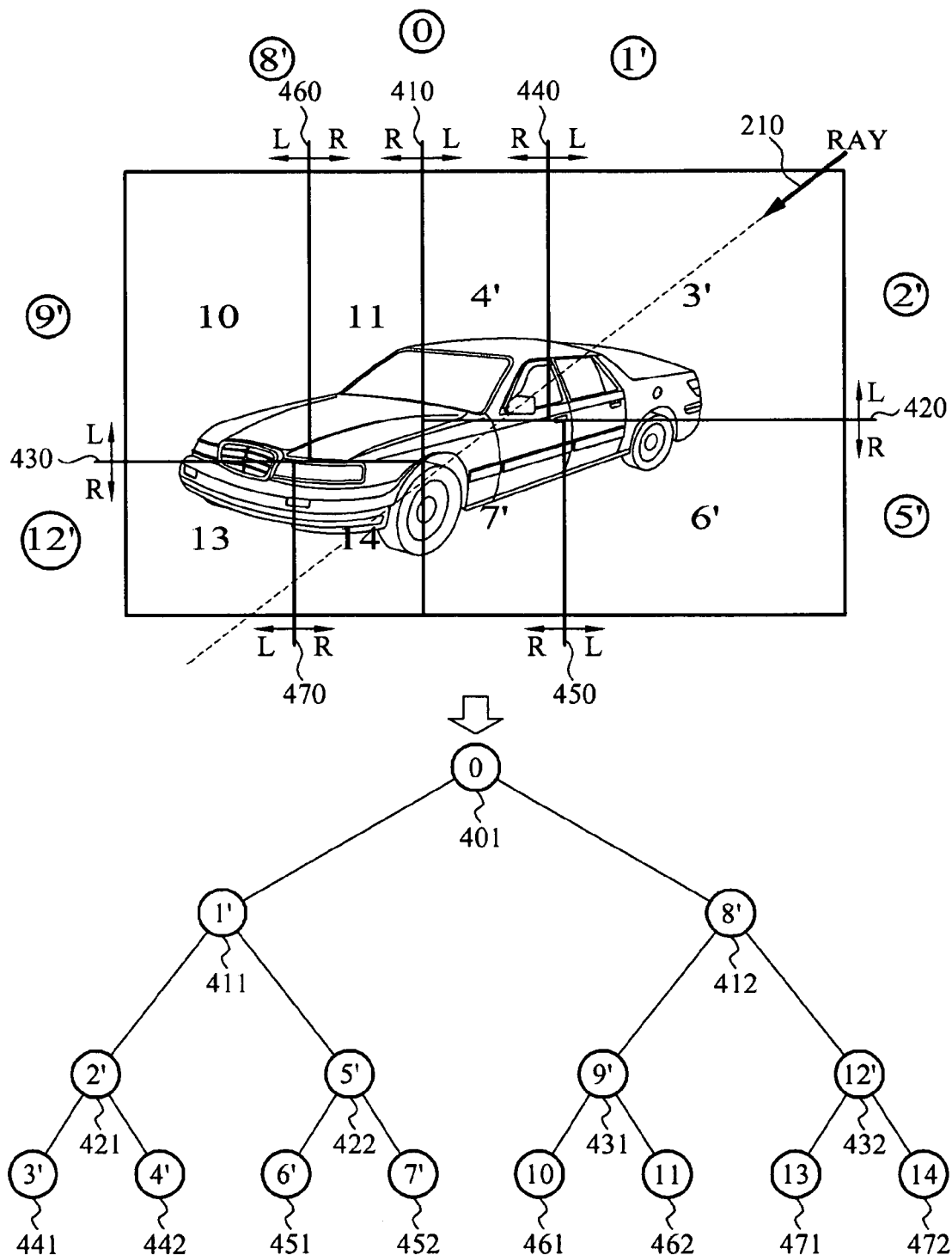
FIG. 4 illustrates a process of generating an acceleration structure by splitting the 3D model of FIG. 2 using an image processing method according to example embodiments.

FIG. 4 illustrates a process of generating an acceleration structure by splitting the 3D model 200 of FIG. 2 according to example embodiments of the image processing apparatus.

When the acceleration structure is generated through space splitting in the 3D model 200, the entire 3D model 200 may correspond to a root node 401.

When the splitting unit 110 of the image processing apparatus 100 splits the 3D model 200 into two subspaces by determining a split surface 410, the decision unit 120 may compare a surface area between the two subspaces.

Within the acceleration structure, the decision unit 120 may determine a subspace having a relatively large surface area as a left child node 411 of the root node 401 and may determine a subspace having a relatively small surface area as a right child node 412 of the root node 401.

In this example, the left child node and the right child node according to the conventional method of FIG. 3 are inverted in FIG. 4. The flag setting unit 130 may add an identification bit, that is, an inverse flag to each generated child node.

The identification bit having a flag function may use a one-bit digit. Since the identification bit uses only a single bit among data bits allocated to each node in generating of the acceleration structure, a significant increase in overall overhead may not occur.

The inverse flag bit may be used for switching the acceleration structure according to example embodiments to the acceleration structure according to the conventional method, or for a ray traversal process.

Through the above process, each of the subspaces corresponding to the left child node 411 and the right child node 412 may be split into two subspaces. Each of four sub-subspaces may be split into two subspaces. FIG. 4 illustrates a result of the split.

A difference between the conventional method of FIG. 3 and the method according to example embodiments may lie in the fact that a child node corresponding to a subspace having a relatively large surface area is set as a left child node through a comparison of a surface area between nodes, and that an inverse flag bit indicating whether the above setting corresponds to a result opposite to the conventional method is added to a corresponding node.

An efficient change of the ray traversal process according to example embodiments will be described with reference to FIG. 5.

Figure 5:
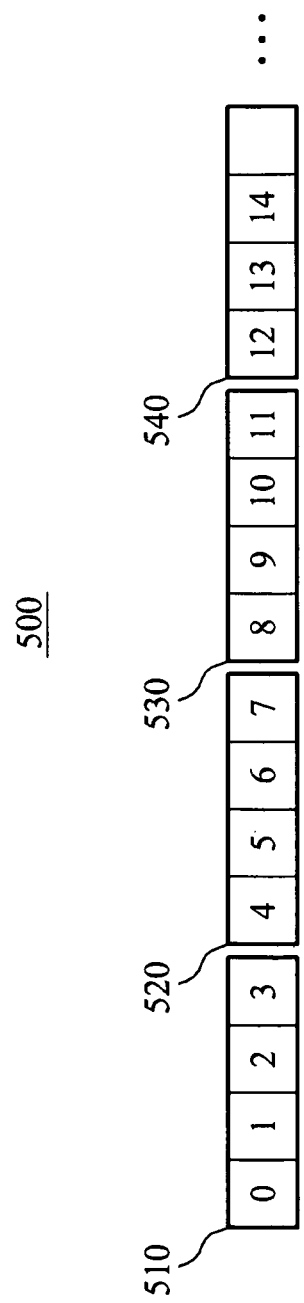
FIG. 5 illustrates an acceleration structure to be cached to a cache after the acceleration structure is generated according to example embodiments.

FIG. 5 illustrates a diagram 500 of an acceleration structure to be cached to the cache 103 after the acceleration structure is generated according to example embodiments.

When the tree-typed acceleration structure generated in FIG. 3 or FIG. 4 is stored in the memory 101, data of node 0 through node 14 may be stored in each of lines 510, 520, 530, and 540 of a dynamic random access memory (DRAM).

Hereinafter, it is assumed that a unit to be cached to the cache 103 is a line unit, for example, the lines 510, 520, 530, and 540.

Referring again to FIG. 3, when a progress of the ray 210 is performed in an order of leaf node spaces 14, 13, 10, 4, and 3, the acceleration structure traversal may be performed by uploading all the data lines 510, 520, 530, and 540 of FIG. 5 to the cache 103, respectively.

Accordingly, a cache hit rate of cached data may decrease, and a relatively large memory bandwidth may be required to upload new node data from the memory 101 to the cache 103 according to a cache miss. During the above process, memory latency may occur and operation speed may be further decreased due to the memory latency.

The deterioration of the operation speed may be significantly fatal in the rendering of the ray tracing scheme, and may be a factor in making real-time ray tracing difficult.

However, referring to FIG. 4, when the acceleration structure according to example embodiments is generated, the progress of the ray 210 may be performed in an order of leaf node spaces 3', 4', 7', 14', and 13' in the spatial structure of FIG. 4.

In this example, since there is no need to upload, to the cache 103, at least one portion, for example, the line 530 among the lines 510, 520, 530, and 540 of FIG. 5, the memory bandwidth may be decreased and the cache hit rate may be increased, thereby enhancing the cache operation efficiency.

The above difference between the conventional method and the method according to example embodiments may generate a significant operation speed difference as a number of splits of the acceleration structure increase, that is, when it is applied to practical 3D scenes.

The aforementioned tree layout of acceleration structure for enhancing the cache operation efficiency may have the following effects.

According to example embodiments, a spatial locality may increase by arranging, in the same caching block to a parent node, a child node expressing a relatively large space, for example, a relatively large surface area between two child nodes generated during the space splitting process.

The increase in the spatial locality may decrease a cache miss rate in ray tracing for the depth first tree traversal. Therefore, according to example embodiments, it is possible to decrease a required memory bandwidth and to enhance a tree traversal performance by decreasing the cache miss.

The acceleration structure generation and traversal process according to example embodiments may be understood to enhance a depth first layout (DFL) widely used for rendering of the ray tracing scheme.

The conventional DFL employs a uniform method of setting, as a left child node, a node having a value less than a split surface, and setting, as a right child node, a node having a value greater than the split surface based on a split axis on a world coordinate system. And the conventional method determines a traversal priority order of a child node through a geometrical location regardless of a visit probability and thus, may be ineffective for use of a parent-child locality.

However, according to example embodiments, an order of a child node may be modified as according to an ordered DFL (ODFL) using a visit probability of a ray with respect to each node.

For example, a node determined as having a relatively high visit probability is set as the left child node and a node determined as having a relatively low visit probability is set as the right child node. As described above, since the spatial locality exists between the parent node and the left child node in the DLF, the cache efficiency may be increased by changing the order as above, which is described above with reference to FIG. 3 through FIG. 5.

The tree traversal using the ODFL with respect to the generated acceleration structure is nearly similar to a general tree traversal. However, to visit each node in a front-to-back order, the inverse flag of a single bit set by the flag setting unit 130 when generating the tree may be used.

In this example, example embodiments in which an order of a child node is determined based on a surface area order instead of using a geometric location of a node may be switched to an acceleration structure of the conventional method as necessary, or an algorithm of the conventional method may be used as is for other ray tracing processes.

A surface area heuristic (SAH) based greedy algorithm may be used for the space splitting and acceleration structure generation process of the splitting unit 110 of the image processing apparatus 100.

A SAH based tree generation algorithm may split a space, for example, a node in a location where a corresponding cost is minimized by modeling an operation cost to be used for the rendering process of ray tracing, when generating a kd-tree.

In this example, an operation cost used when projecting a predetermined ray towards a 3D space may be expressed by a number of objects within a corresponding space and a probability that the corresponding ray passes the space.

A probability that a predetermined ray passes a predetermined area V within the entire 3D space Vs may be determined by a surface area (SA) relationship of each area as given by Equation 1.

$$P_{hit}(V|Vs) = \frac{SA(V)}{SA(Vs)} \quad \text{[Equation 1]}$$

During a kd-tree traversal process, a cost C for traversal of a single node N may be expressed as a cost Kt for traversal of a corresponding node and an intersecting test cost Ki with respect to all the primitive triangles belonging to a left child node and a right child node of the corresponding node, which may be given by Equation 2.

$$C = Kt + Ki * \{(n_L * P_{hit}(V_L|V_S) + n_R * P_{hit}(V_R|V_S)\} \quad \text{[Equation 2]}$$

In Equation 2, $n_L$ denotes a number of triangles belonging to the left child node, $n_R$ denotes a number of triangles belonging to the right child node, $K_t$ denotes a one-time node traversal test cost, and $K_i$ denotes a one-time interesting test cost.

The splitting unit 110 may generate the acceleration structure with respect to a space of the 3D model 200 by locating a split surface in a location where a SAH based cost is minimized through the aforementioned method.

Figure 6:
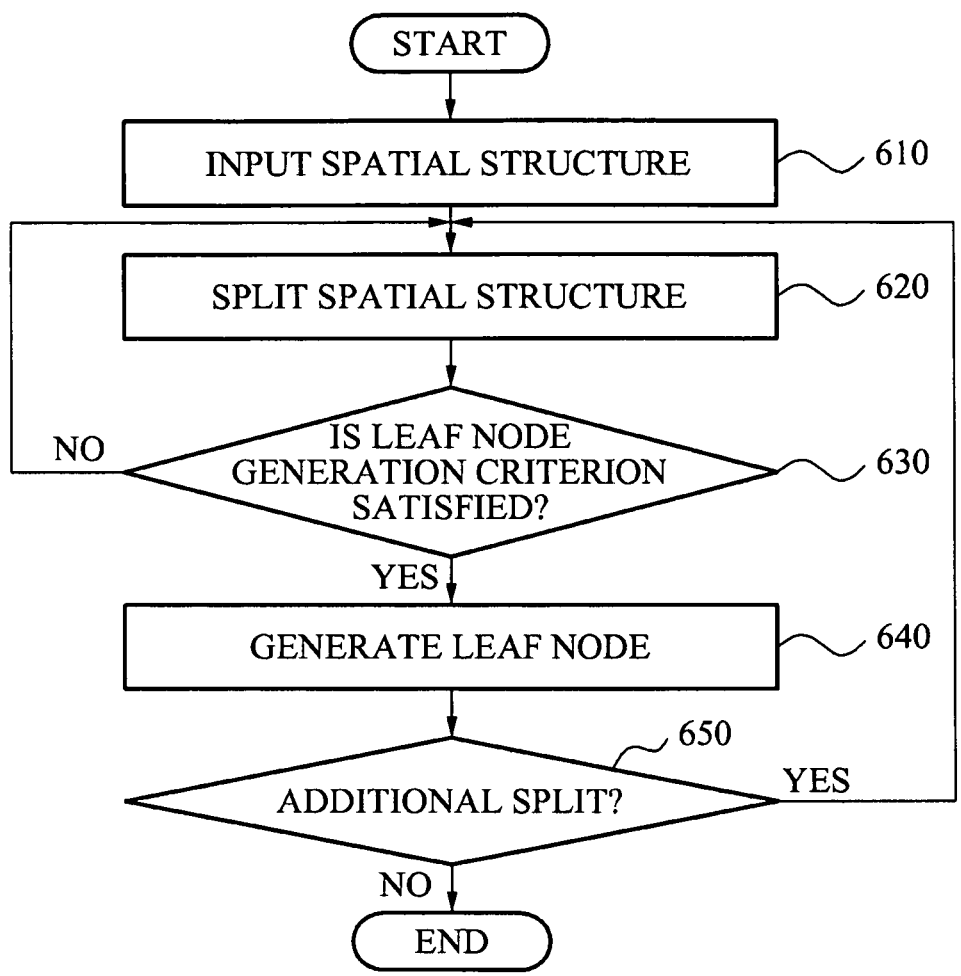
FIG. 6 illustrates an image processing method according to example embodiments.

FIG. 6 illustrates an image processing method according to example embodiments.

In operation 610, a spatial structure of an input 3D model may be input into the image processing apparatus 100.

In operation 620, the image processing apparatus 100 may generate a node of an acceleration structure by splitting the input spatial structure. In operation 630, the image processing apparatus 100 may determine whether a leaf node generation criterion is satisfied. When the left node generation criterion is satisfied, the image processing apparatus 100 may generate a leaf node in operation 640.

For example, the leaf node generation criterion may include a criterion where a number of primitives within a single node is less than a first threshold value, a criterion where a depth of a node is greater than a second threshold value when a depth of a root node is set to "0", a criterion where split with respect to all the axes is completed, and the like.

Conversely, when the leaf node generation criterion is determined to be unsatisfied in operation 630, corresponding nodes may be further split by repeating operation 620.

Depending on determining whether a remaining space to be further split exists in operation 650, operations 620 through 640 will be repeated until the remaining space to be further split does not exist.

Figure 7:
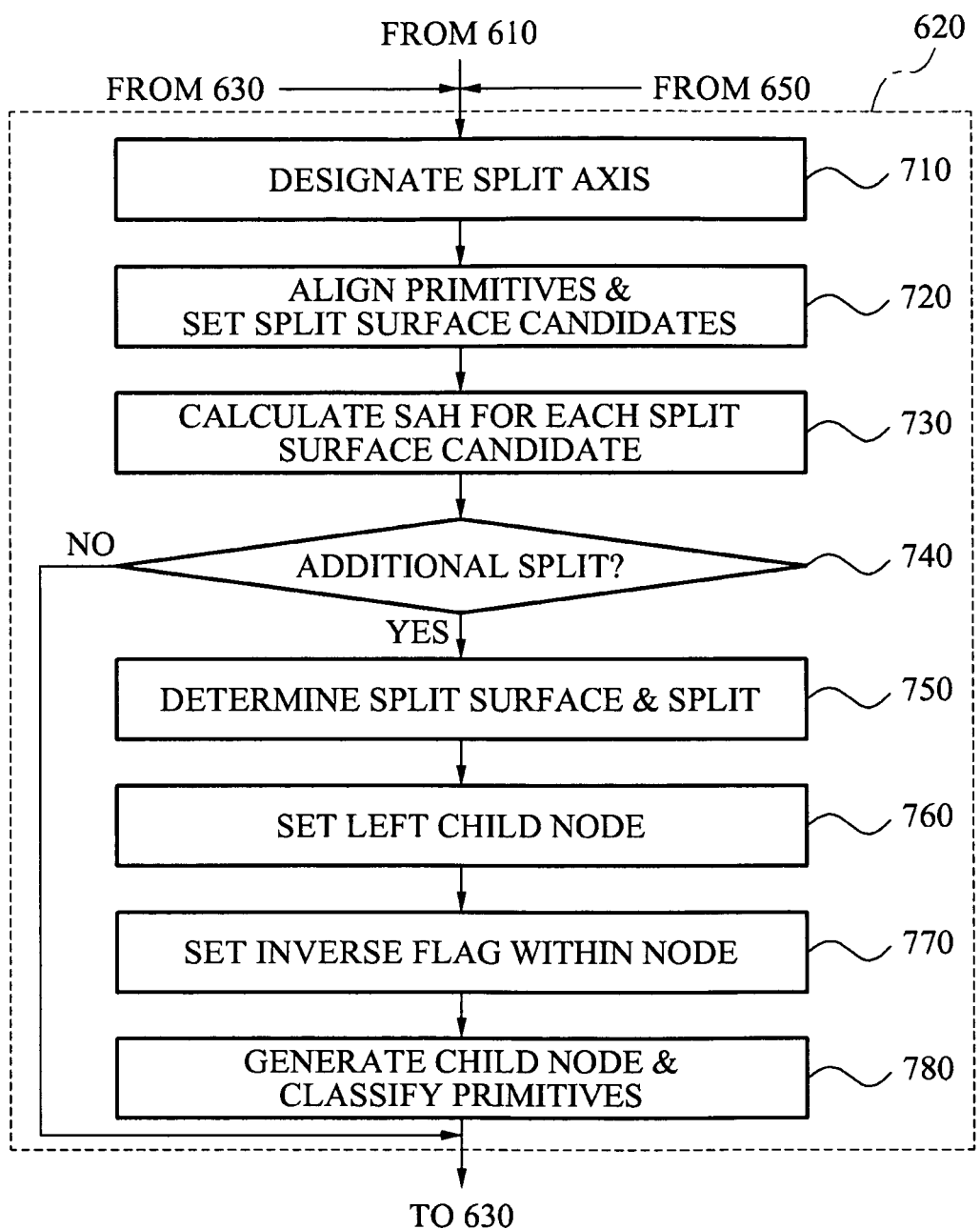
FIG. 7 illustrates an operation of determining whether a leaf node generation criterion is satisfied in the image processing method of FIG. 6.

FIG. 7 illustrates operation 620 in the image processing method of FIG. 6.

In operation 710, the splitting unit 110 of the image processing apparatus 100 may designate a split axis for which split is to be performed.

In operation 720, the splitting unit 110 may align primitives along the split axis and set split surface candidates.

In operation 730, the splitting unit 110 may calculate a SAH for each split surface candidate according to Equation 1 and Equation 2. In operation 740, the splitting unit 110 may determine whether an additional split is necessary.

When the additional split is determined to increase an operation cost, the additional split may be stopped and a subsequent operation may be performed.

Conversely, when the additional split is determined to be necessary, the splitting unit 110 may determine a split surface based on the SAH, and split the determined split surface in operation 750.

In operation 760, the decision unit 120 of the image processing apparatus 100 may be involved in the generating of a child node. When two child nodes are generated by splitting a space corresponding to a single node into two subspaces, the decision unit 120 may set a child node having a relatively large surface area as a left child node.

In operation 770, the flag setting unit 130 may indicate, in each generated node using a flag bit, whether a DFL scheme by a conventional method is inversed.

In operation 780, each child node may be generated and existing primitives may be classified into one of two newly generated child nodes.

Operation 710 through operation 780 are described above with reference to FIG. 4 and FIG. 5.

The image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
a processor;
a splitting unit, executing on the processor, to split a first space within an input three-dimensional (3D) model into a plurality of subspaces in order to generate an acceleration structure of the input 3D model;
a decision unit, executing on the processor, to set a subspace determined as having a relatively high probability of including a ray progress path among the plurality of subspaces, as a child node having a relatively high traversal priority in the acceleration structure among a plurality of child nodes; and
a flag setting unit, executing on the processor, to add, to the child node having the relatively high traversal priority, a flag bit used to identify whether a subspace relatively close to an origin in a world coordinate system among the plurality of subspaces is matched with the subspace determined to have the relatively high probability of including the ray progress path,
wherein the child node having the relatively high traversal priority is arranged in a same caching block to a parent node of the child node having the relatively high traversal priority based on a depth-first layout (DFL).

2. The image processing apparatus of claim 1, wherein the acceleration structure corresponds to one data structure of a kd-tree, a bounding volume hierarch (BVH), and a grid.

3. The image processing apparatus of claim 1, wherein the child node having the relatively high traversal priority corresponds to a left child node that is traversed in a depth first tree traversal prior to other child nodes.

4. The image processing apparatus of claim 1, wherein the splitting unit designates a split axis for splitting the first space, sets at least one split surface candidate by aligning a plurality of primitives within the first space along the split axis, selects a split surface from the at least one split surface candidate according to a surface area heuristic based algorithm, and splits the first space into the plurality of subspaces using the selected split surface.

5. The image processing apparatus of claim 1, wherein the splitting unit recursively repeats the splitting process with respect to a space non-split within the input 3D model until a leaf node generation criterion is satisfied yielding a plurality of children of the child node.

6. The image processing apparatus of claim 1, further comprising:
a memory to store the generated acceleration structure; and
a ray tracer to render an image observed at a predetermined viewpoint according to a ray tracing scheme, using at least one of the stored acceleration structure.

7. The image processing apparatus of claim 1, wherein the child node determined as having the relatively high probability of including the ray among the plurality of child nodes is set by the decision unit as a left child node that is traversed in a depth first tree traversal prior to the plurality of child nodes and a child node determined as having a relatively low probability of including the ray among the plurality of child nodes is set by the decision unit as a right child node.

8. The image processing apparatus of claim 1, wherein the decision unit determines a spatial structure determined as having a relatively large surface area among the plurality of subspaces, as the subspace having the relatively high probability of including the ray progress path.

9. An image processing method, comprising:
splitting, by way of a processor, a first space within an input three-dimensional (3D) model into a plurality of subspaces in order to generate an acceleration structure of the input 3D model;
setting a subspace determined as having a relatively high probability of including a ray progress path among the plurality of subspaces, as a child node having a relatively high traversal priority in the acceleration structure among a plurality of child nodes; and
adding, to the child node having the relatively high traversal priority, a flag bit used to identify whether a subspace relatively close to an origin in a world coordinate system among the plurality of subspaces is matched with the subspace determined to have the relatively high probability of including the ray progress path,
wherein the child node having the relatively high traversal priority is arranged in a same caching block to a parent node of the child node having the relatively high traversal priority based on a depth-first layout (DFL).

10. The method of claim 9, wherein the acceleration structure corresponds to one data structure of a kd-tree, a bounding volume hierarch (BVH), and a grid.

11. The method of claim 9, wherein the child node having the relatively high traversal priority corresponds to a left child node that is traversed in a depth first tree traversal prior to other child nodes.

12. The method of claim 9, wherein the splitting comprises:
designating a split axis for splitting the first space;
setting at least one split surface candidate by aligning a plurality of primitives within the first space along the split axis;
selecting a split surface from the at least one split surface candidate according to a surface area heuristic based algorithm; and
splitting the first space into the plurality of subspaces using the selected split surface.

13. The method of claim 9, wherein the splitting is recursively repeated until a leaf node generation criterion is satisfied yielding a plurality of children of the child node.

14. The method of claim 9, further comprising:
storing the generated acceleration structure; and
rendering an image observed at a predetermined viewpoint according to a ray tracing scheme, using at least one of the stored acceleration structure.

15. The method of claim 9, wherein the child node determined as having the relatively high probability of including the ray among the plurality of child nodes is set as a left child node that is traversed in a depth first tree traversal prior to the plurality of child nodes and a child node determined as having a relatively low probability of including the ray among the plurality of child nodes is set as a right child node.

16. The method of claim 9, wherein the setting comprises determining a spatial structure determined as having a relatively large surface area among the plurality of subspaces, as the subspace having the relatively high probability of including the ray progress path.

17. A non-transitory computer-readable medium comprising a program for instructing a computer to perform the method of claim 9.

* * * * *